(No Model.)
J. C. & I. JAY & B. L. CHAMBERS.
CULTIVATOR.
No. 282,198. Patented July 31, 1883.
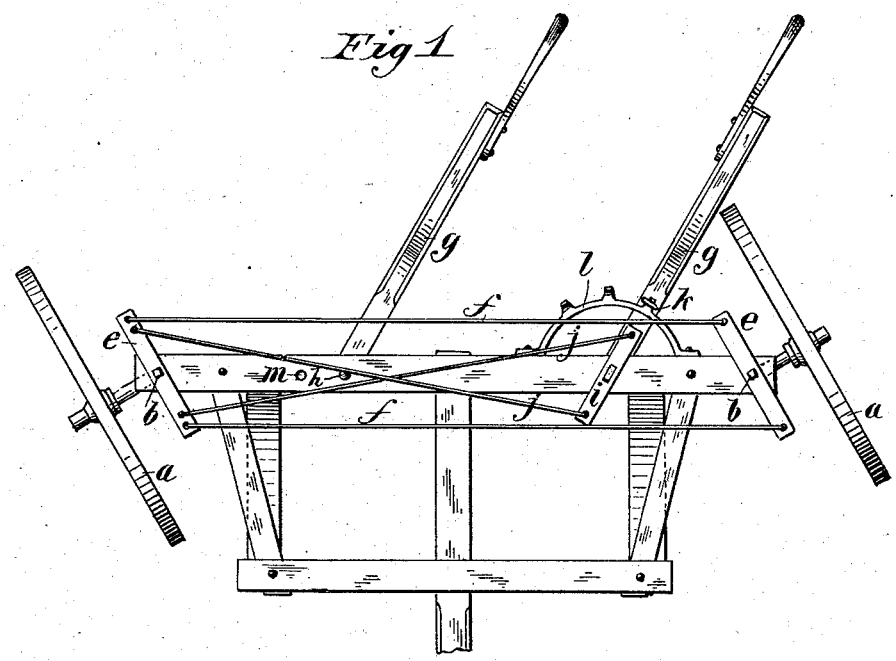
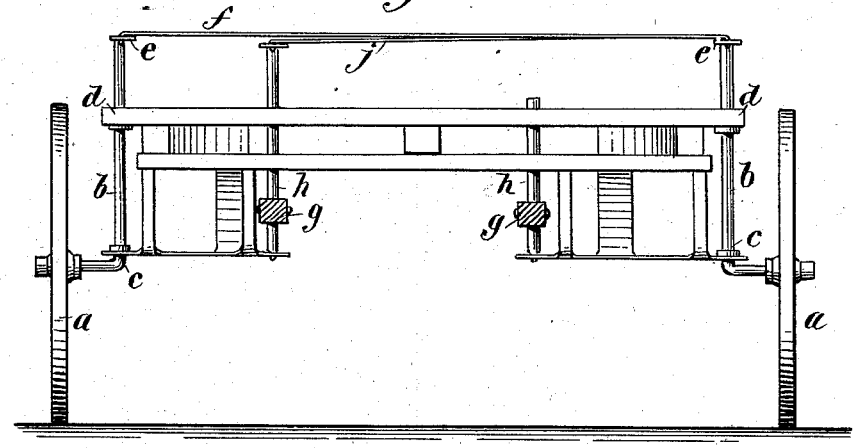
WITNESSES:
INVENTOR:
J. C. Jay
I. Jay
B. L. Chambers
BY
ATTORNEYS.

UNITED STATES PATENT OFFICE.

JAMES C. JAY, ISAAC JAY, AND BURTON L. CHAMBERS, OF ARAPAHOE, NEBRASKA.

CULTIVATOR.

SPECIFICATION forming part of Letters Patent No. 282,198, dated July 31, 1883.

Application filed October 11, 1882. (No model.)

*To all whom it may concern:*

Be it known that we, JAMES C. JAY, ISAAC JAY, and BURTON L. CHAMBERS, of Arapahoe, in the county of Furnas and State of Nebraska, have invented a new and Improved Corn-Cultivator, of which the following is a full, clear, and exact description.

This invention consists of a contrivance whereby the wheels of the cultivator may be guided by lateral movements of the plows, or one of them, to enable the plowman to so control the machine that he can protect the corn from injury by the wheels when the horses fail to properly guide the machine, as hereinafter described and claimed.

Reference is to be had to the accompanying drawings, forming part of this specification, in which similar letters of reference indicate corresponding parts in both the figures.

Figure 1 is a plan view of our improved machine, and Fig. 2 is a transverse section through the plow-beams behind the wheels.

The axles of the wheels $a$ have vertical extensions $b$, which are pivoted in the frame at $c$ and $d$, so as to turn freely, as shown in Fig. 1, and they have a cross-bar, $e$, at the top, the two cross-bars being connected by the parallel rods $f$, in order that the wheels may turn in unison on the vertical extensions $b$, and so that one may be turned by the other. The plow-beams $g$ are connected to the truck by means of the vertical pivot-rods $h$, enabling them to swing laterally, and one of said pivot-rods is connected by cross-bar $i$ and the rods $j$ with one of the cross-bars $e$ of the wheel-connections, the rods $j$ $j$ being crossed for causing the movements of the wheels in the right direction, so that in case the horses may sheer off sidewise the plowman may guide the wheels back to the row of corn by swinging his plows to the right position. The plow-beam having this connection with the wheels may also have an eye-stud, hook, or other device, $k$, to connect with a sector, $l$, for securing it in any desired inclination in case the team may continuously incline to draw to one side or the other, and for guiding the machine to turn around at the sides of the field. The rod $h$ of the plow, not connected to the wheels, is adjustable from one set of holes $m$ into another, for altering the distance between the plows.

Having thus fully described our invention, we claim as new and desire to secure by Letters Patent—

1. The combination, with the wheels $a$ and their axles, having vertical extensions pivoted in the frame, and provided with cross-bars connected together, of the plow-beams $g$, the pivoted rods $h$, cross-bar $i$, and rods $j$, substantially as shown and described.

2. The combination, with the wheels $a$ and their axles, having vertical extensions $b$, pivoted in the frame, and provided with the cross-bars $e$, of the parallel rods $f$, the pivoted beams $g$, the cross-bar $i$ on the end of one of the pivots $h$, and the rods $j$, substantially as and for the purpose set forth.

3. The combination, with the wheels $a$, mounted on axles pivoted vertically in the frame, and provided with cross-bars $e$ on their upper ends, connected together by rods $f$ $f$, of the pivoted plow-beams $g$, the cross-bar $i$, the rods $j$, the hook $k$, and the sector $l$, substantially as and for the purpose set forth.

JAMES C. JAY.
ISAAC JAY.
BURTON L. CHAMBERS.

Witnesses:
E. S. CHILD,
A. F. LAWTON.